US008979643B2

(12) United States Patent
Warner (10) Patent No.: US 8,979,643 B2
(45) Date of Patent: *Mar. 17, 2015

(54) SYSTEMS AND METHODS FOR ELECTRONIC FUND TRANSFERS FOR USE WITH GAMING SYSTEMS

(71) Applicant: Automated Cash Systems, LLC, Zephyr Cove, NV (US)

(72) Inventor: Stephen L. Warner, Zephyr Cove, NV (US)

(73) Assignee: Automated Cash Systems, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/210,450

(22) Filed: Mar. 14, 2014

(65) Prior Publication Data

US 2014/0194194 A1 Jul. 10, 2014

Related U.S. Application Data

(63) Continuation of application No. 13/156,444, filed on Jun. 9, 2011, now Pat. No. 8,715,066.

(60) Provisional application No. 61/354,339, filed on Jun. 14, 2010.

(51) Int. Cl.
*G06F 17/00* (2006.01)
*G07F 17/32* (2006.01)
*G06Q 20/10* (2012.01)
(Continued)

(52) U.S. Cl.
CPC ............ *G07F 17/3244* (2013.01); *G06Q 20/10* (2013.01); *G06Q 40/02* (2013.01); *G06Q 50/34* (2013.01); *G06Q 20/027* (2013.01); *G06Q 20/1085* (2013.01); *G07F 17/32* (2013.01)
USPC ................................. 463/25; 463/29; 463/42

(58) Field of Classification Search
CPC . G06Q 20/027; G06Q 20/1085; G06Q 20/18; G06Q 20/204; G06Q 20/206; G07F 17/32; G07F 19/20
USPC ................................. 463/25, 29, 42
See application file for complete search history.

(56) References Cited

U.S. PATENT DOCUMENTS 5,557,086 A * 9/1996 Schulze et al. ............... 235/380
6,304,860 B1 * 10/2001 Martin et al. .................. 705/43

(Continued)

FOREIGN PATENT DOCUMENTS

| KR | 20-0291099 | 10/2002 |
|---|---|---|
| KR | 10-2006-0049945 | 5/2006 |
| WO | 9634345 A1 | 10/1996 |

*Primary Examiner* — Michael Cuff
(74) *Attorney, Agent, or Firm* — D.C. Williams, P.E.

(57) ABSTRACT

Electronic fund transfer (EFT) systems and methods are disclosed for managing and transferring electronic funds from a patron's financial account to provide gaming or amusement credit in physical or electronic form. The systems comprise an electronic fund transfer (EFT) device, a secure payment gateway configured to connect to the patron's financial accounts via a financial network, a host system, and a funds management portal connected to the host system and to the secure payment gateway. The EFT device is configured to communicate with the patron's financial account via a secure connection to the secure payment gateway and to transmit instructions for transferring electronic funds from the patron's financial account to a credit system via the secure payment gateway and the funds management portal.

20 Claims, 6 Drawing Sheets

(51) Int. Cl.
*G06Q 40/02* (2012.01)
*G06Q 50/34* (2012.01)
*G06Q 20/02* (2012.01)

(56) References Cited

U.S. PATENT DOCUMENTS

| | | | |
|---|---|---|---|
| 6,511,377 B1* | 1/2003 | Weiss | 463/25 |
| 6,547,131 B1* | 4/2003 | Foodman et al. | 235/380 |
| 6,793,134 B2* | 9/2004 | Clark | 235/379 |
| 6,890,258 B2* | 5/2005 | Weiss | 463/25 |
| 6,997,807 B2* | 2/2006 | Weiss | 463/25 |
| 7,004,837 B1* | 2/2006 | Crowder et al. | 463/25 |
| 7,217,190 B2* | 5/2007 | Weiss | 463/25 |
| 7,232,371 B2* | 6/2007 | Gatto et al. | 463/25 |
| 7,819,742 B2* | 10/2010 | Chamberlain et al. | 463/25 |
| 7,844,255 B2* | 11/2010 | Petrov et al. | 455/411 |
| 2003/0003996 A1* | 1/2003 | Nguyen et al. | 463/42 |
| 2003/0083127 A1* | 5/2003 | Weiss | 463/25 |
| 2003/0087692 A1* | 5/2003 | Weiss | 463/25 |
| 2004/0087360 A1* | 5/2004 | Chamberlain et al. | 463/25 |
| 2004/0093309 A1* | 5/2004 | Nakamura et al. | 705/65 |
| 2004/0147309 A1* | 7/2004 | Chamberlain et al. | 463/25 |
| 2005/0090308 A1* | 4/2005 | Weiss | 463/25 |
| 2005/0097017 A1* | 5/2005 | Hanratty | 705/35 |
| 2005/0107155 A1* | 5/2005 | Potts et al. | 463/25 |
| 2005/0107156 A1 | 5/2005 | Potts et al. | |
| 2005/0266919 A1* | 12/2005 | Rowe et al. | 463/25 |
| 2006/0160610 A1* | 7/2006 | Potts | 463/25 |
| 2006/0172798 A1* | 8/2006 | Crowder et al. | 463/25 |
| 2006/0205481 A1* | 9/2006 | Dominelli | 463/25 |
| 2006/0218091 A1* | 9/2006 | Choy | 705/40 |
| 2007/0225068 A1* | 9/2007 | Weiss | 463/25 |
| 2007/0246531 A1* | 10/2007 | Dabrowski | 235/381 |
| 2007/0282858 A1* | 12/2007 | Arner et al. | 707/10 |
| 2008/0015014 A1* | 1/2008 | Weiss | 463/25 |
| 2008/0113776 A1* | 5/2008 | Sommer | 463/25 |
| 2008/0139303 A1* | 6/2008 | Patterson | 463/25 |
| 2008/0153583 A1* | 6/2008 | Huntley et al. | 463/25 |
| 2008/0242403 A1* | 10/2008 | Weiss | 463/25 |
| 2009/0005157 A1* | 1/2009 | Netley et al. | 463/25 |
| 2009/0005159 A1* | 1/2009 | Netley et al. | 463/25 |
| 2009/0099965 A1* | 4/2009 | Grant, IV | 705/41 |
| 2009/0131146 A1* | 5/2009 | Arezina et al. | 463/20 |
| 2009/0138369 A1* | 5/2009 | Raja | 705/26 |
| 2009/0287524 A1* | 11/2009 | Gnoato | 705/8 |
| 2010/0222132 A1* | 9/2010 | Sanford et al. | 463/25 |

* cited by examiner

SYSTEMS AND METHODS FOR ELECTRONIC FUND TRANSFERS FOR USE WITH GAMING SYSTEMS

RELATED APPLICATIONS

This application is a Continuation of U.S. patent application Ser. No. 13/156,444 filed on Jun. 9, 2012 and entitled "System and Method for Electronic Fund Transfers for Use with Gaming Systems" which claims priority from U.S. Provisional Patent Application No. 61/354,339, entitled "System and Method for Wireless Electronic Fund Transfers for Use With Gaming System" and filed on Jun. 14, 2010. The instant application is commonly assigned, claims the benefit of, and incorporates herein by reference in their entireties both of the applications enumerated above. In this regard, in the event of inconsistency between anything stated in this specification and anything incorporated by reference in this specification, this specification shall govern.

FIELD OF THE INVENTION

The present invention relates to a system and a method for electronic fund transfers, and in particular to electronic fund transfers for use with gaming systems.

BACKGROUND OF THE INVENTION

Currently, the primary method of transferring funds into a gaming device is through cash or cash equivalents, including "cash value tickets" and ticket-in/ticket-out (TITO) tickets. Similarly, funds are transferred into an amusement device through cash, "cash value cards", game tokens, or coupons. The funds are usually converted into gaming or amusement credits through a cash acceptance device such as a bill acceptor or card reader associated with the gaming device. The gaming or amusement credits are then exported onto cash value tickets or value on a card to be used in a gaming or amusement facility. At the discretion of the patron, the gaming or amusement credits can be redeemed and converted back into cash. A ticketing system or a value card system is used to read the tickets, print tickets, or write onto the value card the amount to be cashed out at an external kiosk or cashier station.

A patron usually accesses funds in his financial account via an ATM machine or cash machine. While playing a game, if a patron runs out of cash and needs to access the funds in his bank account, he must stop the play at the gaming or amusement device, find an ATM machine, extract cash, convert the cash into a cash equivalent (if necessary) and then return to the gaming or amusement device, and if it is not already occupied, insert the cash or the cash equivalent into the gaming or amusement device to continue play. Many players find this interruption in the gaming process not desirable, primarily because they don't want to lose their gaming device or position. Therefore, there is a need for a more convenient way for the patrons to access their funds while playing in a gaming or amusement device without having to leave their device or position.

An ATM or cash machine operates over an ATM network such as NYCE, PLUS, STAR, to transfer money from a cardholder's financial account to the ATM operator's account. The ATM operator or the property owner of the facility where the ATM is positioned and operated is responsible for loading the cash supply in the ATM, for the security of the cash, and for the maintenance of the ATM machine. Normally an ATM is connected to an ATM network, which is then connected to the customers' financial account. Financial institutions and banks have signed contracts with the ATM network to transfer money out of the customer's financial or bank account to the ATM network, and the ATM network pays the operator of the ATM.

A gaming device that accepts cash or cash equivalent funds from a patron, holds the funds in the form of "game credits" while the patron plays at the gaming or amusement device, and enables the patron to retrieve his funds at any time. Therefore, gaming and amusement devices do not require the patron to input a wagerable or playable amount of money in the gaming or amusement device each time the player wishes to play a device. When the patron wins, the gaming or amusement devices do not require the patron to immediately take the winnings if the patron desires to continue play. Furthermore, gaming or amusement devices provide a mechanism by which the patron can input and maintain a pool of money (i.e., credits) or amusement credits of non-cash value in the gaming or amusement device to play many games of the gaming or amusement device. The gaming or amusement device can also accumulate and store the patron's winnings. When the patron wishes to stop playing, the gaming or amusement devices provide a mechanism by which the patron can retrieve the money or non-cash value credits that remain in the pool. Accordingly, there is a need for an efficient fund transfer process to a gaming or amusement device that does not include the inefficient conversion of funds from bank accounts to cash to credit. There is also a need for a fund transfer process to a gaming or amusement device that does not require a large amount of cash in float in the gaming or amusement devices throughout the gaming or amusement facility. There is also a need for a less costly way for providing funds for gaming/amusement purposes.

Problems facing the current electronic funds transfer systems include security and fund transfer confirmation. Many regulatory agencies do not approve electronic funds transfer systems that do not confirm the fund transfer, i.e., there is no lasting evidence that a fund transfer has occurred. Therefore, the electronic fund transfer system needs to provide such evidence so that electronic funds transfers can occur in a more secure fashion. Accordingly, there is a need to make a secure electronic funds transfer system. A further need exists to provide evidence of the electronic transaction. A still further need exists to provide a wireless electronic fund transfer system designed to place the funds in the patron's hands rather than directly in the credit meter of the gaming device.

Further, in current gaming systems, because the transfer of money to game play is seamless, the gaming or amusement device is required to have the ability to send and receive authorization information, realize an amount of money that has been transferred, convert the money amount into a game or amusement credit amount, add or subtract an amount of credits that the player thereafter wins or loses and issue an appropriate cash out when the player desires. Accordingly, the game device's processor handles the normal game accounting in combination with the electronic funds transfer accounting.

Card and/or ticket systems are also used in connection with gaming or amusement machines in cases where the gaming or amusement machines issue and accept cards and/or tickets in lieu of money. Such systems provide a workable cashless system on a local or property level. The casino operator redeems an amount of money from the card system for the assigned card and/or from the value imprinted on the ticket through visual inspection or via a ticket validation system. Card and/or ticketing systems are advantageous because they reduce the amount of cash transactions and the need for the patron to transport and hold large amounts of cash or coins. Consequently, ticketing systems have become common in most gaming and amusement jurisdictions. Various manufacturers produce these types of ticketing systems. These systems require each machine to have a card reader and/or ticket printer.

The role of the card reader device and/or ticketing machines has recently been expanded to enable patrons to redeem the card value and/or ticket at a gaming or amusement device. As before, the card and/or ticketing system issues cash out card credit to the card system and/or ticket in response to a patron's cash out request. In the expanded role, the cash out card and/or ticket includes information that enables the patron to present the card and/or ticket to a cashier or redemption machine, as before, or to re-insert the card and/or ticket into a gaming or amusement device configured to accept card and/or ticket transactions.

In this expanded role, the card and/or ticket accepting gaming or amusement devices must now contain a card and/or ticket reader as well as the card system communication and/or ticket printer. In the expanded system, the cash out card communicates with a local card system which tracks date and time of cash out credits for the identification card and the ticket typically contains a barcode, a written ticket amount, the time and date of printing, a numerical representation of the barcode, and other identification and validation information specific to the property. To redeem the card and/or ticket for its cash or non-cash value, the patron either presents the card and/or ticket to the operator who validates the card and/or ticket and pays the patron an amount of money or prizes, or the patron inserts the card and/or ticket into a card and/or ticket-ready gaming or amusement device whereby the gaming or amusement device provides the patron with a number of credits equal to the amount represented by or encoded in the card system or on the ticket.

The controllers of the card and/or ticket-ready gaming devices are adapted to coordinate with the card and/or ticket validation system. For example, when a payout is issued the card and/or ticket is inserted into a card and/or ticket reader equipped in a gaming or amusement device, the ticket reader forwards information, which can be stored on a barcode in the instance of tickets, to the game's or amusement's controller. The game or amusement controller recognizes this information as card and/or ticket information and forwards the card and/or ticket information to a card and/or ticket validation system outside the gaming or amusement device. The card and/or ticket validation system analyzes the card and/or ticket information, and if the card and/or ticket is valid, the card and/or ticket validation system provides the game or amusement controller with an authorization to credit the gaming machine with the amount represented by the credits in the card system or represented by encoded value on the ticket.

Alternatively, if the card and/or ticket validation system detects that the card and/or ticket is not valid, the card and/or ticket validation system instructs the game or amusement controller to reject the card and/or ticket. The card and/or ticket validation system may also log the failed attempt in a statistical database that will record the Information for future reference.

Card and/or ticketing benefits each patron, not just those wishing to access funds from or near the gaming and/or amusement device. Gaming and amusement establishments have also become familiar with the card and ticketing systems and their proven performance. Card and ticketing systems are proliferating within the gaming and amusement industry.

Accordingly, a need exists for an electronic funds transfer system that eliminates the inefficiency of the intermediary step of having to use an ATM cash machine to transfer money from a patron's bank account to a gaming device. Furthermore, a need exists for an electronic funds transfer system that utilizes the card and/or ticketing system's hardware and software as much as possible to avoid duplication of such hardware and software in accounting for the transfer of the electronic funds.

SUMMARY OF THE INVENTION

The present invention provides devices, systems, and methods for electronic funds transfers that originate from a gaming or amusement device using a secure ATM-like terminal to withdraw money electronically from a patron's financial account and to transfer credit to a slot, table or amusement host system. The amusement host system then dispenses a confirmation of credit at the gaming or amusement device which can be a printed ticket of equivalent value or issued credit to a player card confirmed at the gaming device or credits the gaming device directly. The electronic fund transfer (EFT) system includes an EFT terminal that accepts secure PIN based ATM transactions at a gaming device, a secure payment gateway that routes transactions to the ATM network, and a system by which to route confirmation of funds to a funds management portal with appropriate information on which gaming device is associated with the transaction. The funds management portal then connects to a host system and the host system specifies at which gaming device to print out the ticket or to which gaming device to credit the transferred funds. Alternatively, the EFT system is used to transfer funds from the patron's financial account securely to a prepaid debit card, which debit card may be a player card issued by the gaming facility for loyalty purposes. Such player cards can be used by the patron just like any Visa, Master Card, or as an ATM card, and the player card can be used to track the patron's spend and game playing and for the patron to earn "Free Plays" from the casinos and earn other rewards for using their cards while playing games.

In general, in one aspect, the invention features an electronic fund transfer system for managing and transferring electronic funds from a patron's financial account to a credit system. The system includes a credit system configured to dispense credit to a patron via physical or electronic credit means, an electronic fund transfer (EFT) terminal, a secure payment gateway configured to connect to the patron's financial accounts via an ATM network, a host system connected to the credit system via a local network, a funds management portal connected to the host system and the secure payment gateway, and means for transferring electronic funds from the patron's financial account to the credit system via the secure payment gateway. The funds management portal is configured to account and reconcile the transferred electronic funds. All communications between the secure payment gateway and the host system pass through the funds management portal. The EFT terminal includes a secure client-side application for receiving instructions from the patron for transferring electronic funds from the patron's financial account to the credit system and means for transmitting the fund transfer instructions to the patron's financial account. The EFT terminal is configured to connect to the secure payment gateway and to communicate with the patron's financial account and to transmit the instructions for transferring electronic funds from the patron's financial account to the credit system via the secure payment gateway.

Implementations of this aspect of the invention may include one or more of the following features. The physical or electronic credit means may be TITO tickets, vouchers, chips, credits on a gaming device, credits on a remote electronic game, or credit to a player's card system. The system may further include a gaming device configured to receive the physical or electronic credit means. The EFT terminal may be a Payment Card Industry (PCI) and Pin Entry Device (PED) certified device. The EFT terminal includes a point-of-sale (POS) personal identification number (PIN) entry keypad, a payment card reader, a display, network connectivity modules, a printer, a printer port, secure mobile applications and one or more EFT applications. The payment card reader may be a smart card reader, magnetic card reader, contactless card reader, proximity mobile payments reader that enables communication with smart phone devices or contactless proximity card reader that processes secure smart ticketing and electronic payments using contactless secure mobile commerce technology. The means for transmitting the fund transfer instructions from the EFT terminal to the patron's financial account may be secured wireless data network or secured wired data network. One of the EFT applications may be a patron interface application and the patron interface application includes one or more fields identifying the credit system to which the electronic funds are to be transferred, ATM network, type of transaction, electronic fund amount to be transferred, date, time, name of host system, or name of patron. The funds management portal includes a database with encrypted data, a communication interface to the secure payment gateway, a communication interface to the host system, an operator patron application, a firewall between the funds management portal and the host system, and a firewall between the funds management portal and the secure payment gateway. The database includes encrypted data for each electronic fund transaction and the encrypted data comprise at least one of EFT terminal ID, transaction ID, credit system ID, patron's name, host system's name, transaction value, date, or time. The secure payment gateway connects to the ATM network via a single, secure, access controlled connection. The connection is access controlled by an application privilege protocol and secured by an application security protocol and the application privilege protocol is managed by the secure payment gateway and comprises a first table associating Global Unique Identifiers (GUIDs) of EFT applications, ATM networks, and patron financial accounts available to the EFT terminal. The application security protocol comprises one of secure HTTP (S-HTTP), link encryption, or web services security (WS-S). The secure client-side application comprises an application patron interface. The EFT terminal comprises a communication device upon which the client-side application is executed. The EFT terminal may be a mobile phone, smartphone, personal digital assistant (PDA), payment module, portable computer, personal computer, server, or a computing circuit. The system may further include a printer connected to the credit system and the printer is configured to print tickets and vouchers. The gaming device may be a slot machine, a table game device, a betting parlor, kiosk, poker, pan, pai gow, race and sports book, race track, pari-mutuel betting, keno, bingo, or an amusement device. The system may further include a plurality of EFT terminals and a plurality of printers connected to a plurality of gaming devices. The ATM network may be one of PLUS, STAR, CIRRUS, INTERLINK, MONEY PASS or NYCE. The network connectivity modules may be Bluetooth, infrared, optical, radio frequency, GPRS, satellite, wired, or wireless modules. The EFT terminal requests functionality from the secure payment gateway via one of Extensible Mark-up Language (XML) messages embedded in Simple Object Access Protocol (SOAP) requests, Action Script Message Format (AMF), or Secure Mobile Application Platform (SMAP).

In general, in another aspect, the invention features an electronic fund transfer method for managing and transferring electronic funds from a patron's financial account to a credit system. The method includes the following steps. First, providing a credit system configured to dispense credit to a patron via physical or electronic credit means. Next, providing an electronic fund transfer (EFT) terminal comprising a secure client-side application for receiving instructions from the patron for transferring electronic funds from the patron's financial account to the credit system and means for transmitting the fund transfer instructions to the patron's financial account. Next, providing a secure payment gateway configured to connect to the patron's financial accounts via an ATM network. Next, providing a host system connected to the credit system via a local network. Next, providing a funds management portal connected to the host system and the secure payment gateway and configured to account and reconcile the transferred electronic funds. All communications between the secure payment gateway and the host system pass through the funds management portal. Next, connecting the EFT terminal to the secure payment gateway and communicating with the patron's financial account and transmitting the instructions for transferring electronic funds from the patron's financial account to the credit system via the secure payment gateway. Finally, transferring electronic funds from the patron's financial account to the credit system via the secure payment gateway.

In general, in another aspect, the invention features a method for managing and transferring electronic funds from a patron's financial account to a credit system. The method includes the following steps. First, providing an electronic fund transfer (EFT) terminal. Next, initiating an application in the EFT terminal via a payment instrument, thereby causing the EFT terminal to send a request to a secure payment gateway to connect to an ATM network of the patron's financial account associated with the payment instrument. Next, checking if the payment instrument is acceptable by the secure payment gateway, and if the payment instrument is acceptable, sending a response to the EFT terminal comprising a patron interface of the financial application associated with the payment instrument. Next, entering patron name and PIN in the patron interface by the patron and sending the entered information to the secure payment gateway. Next, sending a request comprising a GUID of the financial application associated with the payment instrument, patron name, patron's financial account and patron's PIN to an ATM network server. Next, sending the received request from the ATM network server to a financial server of the patron's financial account. Next, confirming access to the financial application via the secure payment gateway to the EFT terminal by the financial server and presenting available electronic fund transactions to the patron via the patron interface. Next, selecting a desired electronic fund transaction by the patron and entering electronic fund transaction details in patron interface fields. Next, sending desired electronic fund transaction details to the financial server via the secure payment gateway. Next, processing the requested desired electronic fund transaction by the financial server and sending electronic fund transaction confirmation to the secure payment gateway. Next, sending electronic fund transaction confirmation to the EFT terminal and to the funds management portal by the secure payment gateway. Next, transferring the electronic fund transaction confirmation to a host system by the funds management portal. Next, transferring electronic funds to a credit system by the host system and printing a ticket indicating electronic funds transacted via a printer connected to the credit system or crediting a specific gaming device.

Finally, receiving the printed ticket by the patron and using it in a gaming device or cashing it out. The payment instrument may be a payment card, smart card, magnetic card, contactless card, smartphone or a proximity card.

Among the advantages of this invention may be one or more of the following. The invention provides a gaming or amusement device having an EFT system that employs existing card and ticket system hardware where applicable. The EFT system incorporates secure ticketing and banking networks. Furthermore, the invention provides a method of electronically transferring funds to the patron for subsequent gaming or non-gaming uses. Yet another advantage of the present invention is to provide a receipt to the patron so that the patron has a record or evidence of the electronic fund transaction. The present invention provides convenience to patrons and efficiency and cost savings to gaming and amusement facilities.

DETAILED DESCRIPTION OF THE INVENTION

The present invention relates in general to an electronic funds transfer (EFT) system for transferring gaming credits to gaming or amusement devices.

The gaming or amusement device system normally contains a cash acceptance device (bill acceptor) to convert cash into credits for play. It may also contain a loyalty card system and/or a ticketing system that includes a ticket reader and a ticket printer to print tickets when the patron is ready to "Cash Out" such that the value remaining in the gaming or amusement device can be printed on the ticket with a special barcode or system recognizable code for use in another machine or can be redeemed for cash with a cashier or attendant in the specific gaming or amusement facility. Normally, credit is issued on the gaming or amusement device when cash is inserted into the device, or a ticket with value on it is read by the device, or a loyalty card is read which can provide free play, thus allowing the patron to play the game. If a patron is playing on a gaming device and runs out of credit and has no more cash to put into the gaming or amusement device, the patron is forced to leave the gaming or amusement device in order to find an ATM cash machine, kiosk, or cashier station to withdraw cash and then return to the gaming or amusement device.

The EFT System contains a secure ATM-like terminal with PIN (Personal Identification Number) pad that is Payment Card Industry (PCI), PIN Entry Device (PED) certified along with a magnetic stripe and smart card reader and a display which allows the patron to obtain cash equivalent without having to leave and find a ATM machine. The EFT terminal can be an external attachment to the gaming or amusement device or embedded in the gaming or amusement device. Each EFT terminal is associated with a specific gaming or amusement device. The process works similar to an ATM process.

When the patron swipes his debit card, enters a PIN, and requests a specific amount to be debited from his account (for a fee), the EFT terminal sends a secured request via a wireless or wired data network, through the EFT system out to a financial network for approval or denial of an ATM debit transaction request. If the transaction request is approved, the EFT system provides authorized cash value credits to be sent back to a host system. The host system initiates and prints a ticket with the transferred amount of value, at the specific gaming device where the EFT terminal is located. Alternatively, the host system updates the patron's loyalty/prepaid debit card account with the transferred amount of fund. The patron can use the card or ticket on a variety of gaming or amusement devices to receive game credits or redeem the card or ticket for cash through the authorized gaming or amusement device system.

The card and/or ticket validation system is connected to or is in communication with a card and/or ticket validation network. The card and/or ticket validation system includes a card and/or ticket validation server and operator interfaces to enable the operators to redeem card credits and/or tickets as well as to monitor card and/or ticketing transactions. The card and/or ticket validation network enables a plurality of gaming or amusement device processors in the same casino or property establishment to communicate with the same card and/or ticket validation system.

The ticket reader uses software for reading the barcode of a ticket, and after reading the barcode, the ticket reader passes the barcode information to the processor of the gaming or amusement device. The gaming or amusement device then forwards the barcode information to the ticket validation system via the ticket validation network to verify its authenticity. After verifying the authenticity, the ticket validation system presents an authorization to the gaming or amusement device for the ticket amount, via the ticket validation network, and the gaming device in turn adds credits to its credit meter in the amount authorized by the ticket validation system. Finally, the gaming or amusement device instructs the ticket reader to retain the used ticket internally so that it is not returned to the presenter.

The ticket validation network is thus preferably a local area network. This local area network, in turn, is connected to or is in communication with a secure payment gateway that validates electronic fund requests. The gaming devices are also equipped with EFT terminals (electronic funds transfer ATM units) that control a card reader, a secure PCI certified PIN Pad and a display for enabling a patron to enter the patron's account number, transaction type (i.e., credit or debit), desired transfer amount and personal identification number (PIN). The display prompts the patron for such information and informs the patron of fund request approvals and rejections. A printer may be attached to print out a receipt for evidence of the transaction.

The present invention enables the patron to enter the required fund transfer information, (which can include the PIN, transaction type, and the transfer amount.) The request is processed and, if approved, the player receives a cash equivalent ticket in the amount of the requested transfer or the gaming device is credited with the approved amount. This effectively emulates every step that an ordinary ATM does except the output is a ticket or credited credits to a specific gaming device instead of cash. The cash equivalent ticket is redeemable for cash through a ticket redemption machine, cashier station, or kiosk, or for placing credits into a gaming or amusement device that has a card and/or ticket reader. The present invention therefore provides time for the patron to confirm the patron's decision to withdraw the money. The patron can choose to not spend the money, to wager the money, or to spend it in a non-gaming fashion.

The patron can also remove money from their debit card accounts on one machine with the idea of playing the money or credit/ticket at another machine. This enables machines that accept patron cards or tickets, but not debit cards, to accept funds from a debit card transaction. Further, by communicating through the gaming or amusement device host system to the printer that already exists in a gaming or amusement device, the cost of a separate ticket printer is eliminated. Having one printer instead of two reduces the number of printer rolls that the gaming establishments have to stock and reload.

The processor of the gaming or amusement device is still connected to or in communication with the ticket reader/validator and is responsible for verifying validity of the ticket. The EFT system communicates a request to the card and/or ticket system which after authorization of funds transfer, provides credits associated to the card or prints a ticket with a barcode from the gaming or amusement device.

In operation, the patron withdraws money by inserting a payment card into a specific EFT terminal associated with a specific gaming device, selects payment transaction type and account from which he is withdrawing funds, accepts any service charge fees associated with the transaction, and enters a PIN number and an amount The transaction request then goes out through the network to which the EFT terminal is connected (wireless or wired) to the secure payment gateway of the EFT system, which transmits the request through the financial network to process the transaction request, which returns an appropriate response over the financial network back to the secure payment gateway, which routes a specific response back through the appropriate network to the specific EFT terminal assigned to a specific gaming or amusement device or location.

If the patron's money transfer request is approved, the specific EFT terminal will get a message like "Transaction Approved, Please wait for TITO Ticket to be Printed", or the gaming device is automatically credited with the approved amount requested, and it may also print out a separate receipt "evidence" for the ATM transaction from a separate thermal printer as part of the EFT terminal, simultaneously the secure payment gateway of the EFT system communicates to a funds management portal (gaming or amusement gateway) of the EFT system, to specify which specific gaming or amusement device successfully withdrew how much money. The funds management portal then communicates with the slot, table or amusement host system for the specific gaming or amusement device printer to print a ticket for the patron, which the patron can use with any gaming device that will accept such a ticket, or credit the gaming device automatically with approved amount requested. The patron can alternatively redeem the ticket for cash, or request a ticket for the credits.

If the patron's money transfer request is denied for whatever reason, the secure payment gateway of the EFT system will simply send a denial message back to the EFT terminal and request either a different PIN or payment card, or for the patron to cancel and exit the transaction.

Alternative to printing a ticket, the EFT System may tie directly into the credit system of the gaming machine, thereby eliminating one more step of printing and reinserting the ticket back into the machine to play. The patron can simply continue playing with the new credit received, or it can hit the "Cash Out" button for the printer to print the ticket, or transfer the funds directly back to the patron's financial account.

Alternative to printing tickets, the value can also be transferred by the EFT system from the patron's financial account into a stored value player card. The player card can be used in the gaming or amusement device to transfer stored value into credits in the gaming or amusement device, and "Cash Out" back into the player card. Traditional player cards today are typically loyalty cards only and do not contain a stored value aspect that can allow the patron to use the card in an open loop environment to shop or dine anywhere that accepts Visa or Master Card. The proposed invention allows a loyalty card to be coupled with a prepaid debit card into one player card. By allowing a transfer of funds from one's financial account to a player card via the EFT System, the patron can securely use his player card and obtain reward points from the gaming or amusement establishment while the gaming or amusement establishment has a way to maintain loyalty and get to know its patrons' habits better.

Figure 1:
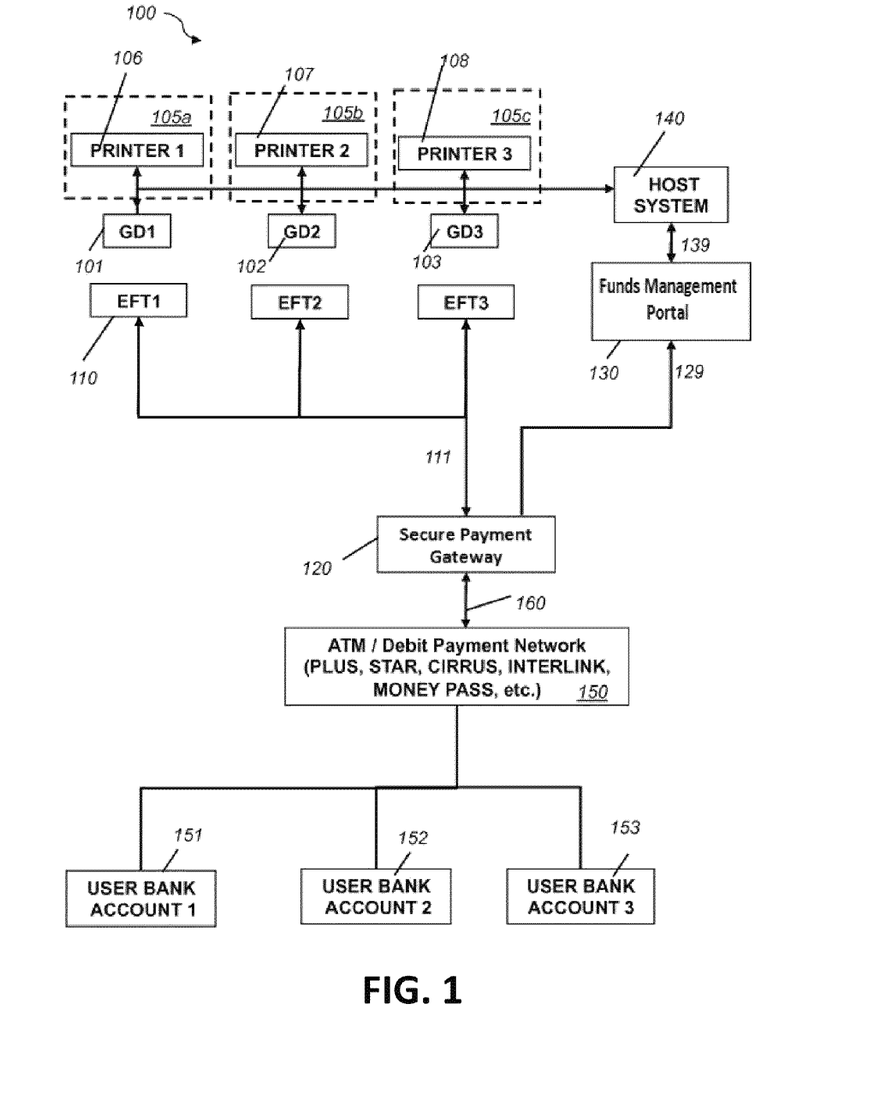
FIG. 1 is an overview diagram of the EFT system.

Referring to FIG. 1, an electronic fund transfer (EFT) system 100 includes gaming devices 101, 102, 103, gaming credit systems 105a, 105b, 105c, a gaming host system 140, EFT devices 110, a secure payment gateway 120 and a funds management portal 130. Host system (or Casino Management System) 140 is connected to the gaming credit systems 105a, 105b, and 105c via a local network. Each gaming credit system 105a, 105b, and 105c is also connected to a printer 106, 107, or 108, respectively, for printing tickets. EFT terminals 110 are placed in the same locations as the gaming devices 101, 102, 103. EFT terminals 110 communicate with the ATM networks 150 via a network connection. All communications between the EFT terminals 110 and the ATM networks 150 pass through the secure payment gateway 120. The ATM networks 120 provide connections to the patron's financial accounts 151, 152, 153 from where the funds are withdrawn. In one example, the financial account is a bank account. In other examples, financial accounts are online bank accounts, investment account, business, accounts, credit lines, credit card accounts, debit card accounts, or PayPal accounts, among others. Examples of ATM networks include PLUS, STAR, CIRRUS, INTERLINK, MONEY PASS, among others. The fund transfer is communicated back to the secure payment gateway 120 via the ATM networks 150 and the secure payment gateway 120 transmits the fund transfer to the funds management portal 130. The funds management portal 130 receives the fund transfer confirmation from the secure payment gateway 120 and sends it to the gaming host system 140. The gaming host system 140 then transmits the funds to the appropriate gaming credit system 105a, 105b, or 105c that was designated by the patron.

Figure 2:
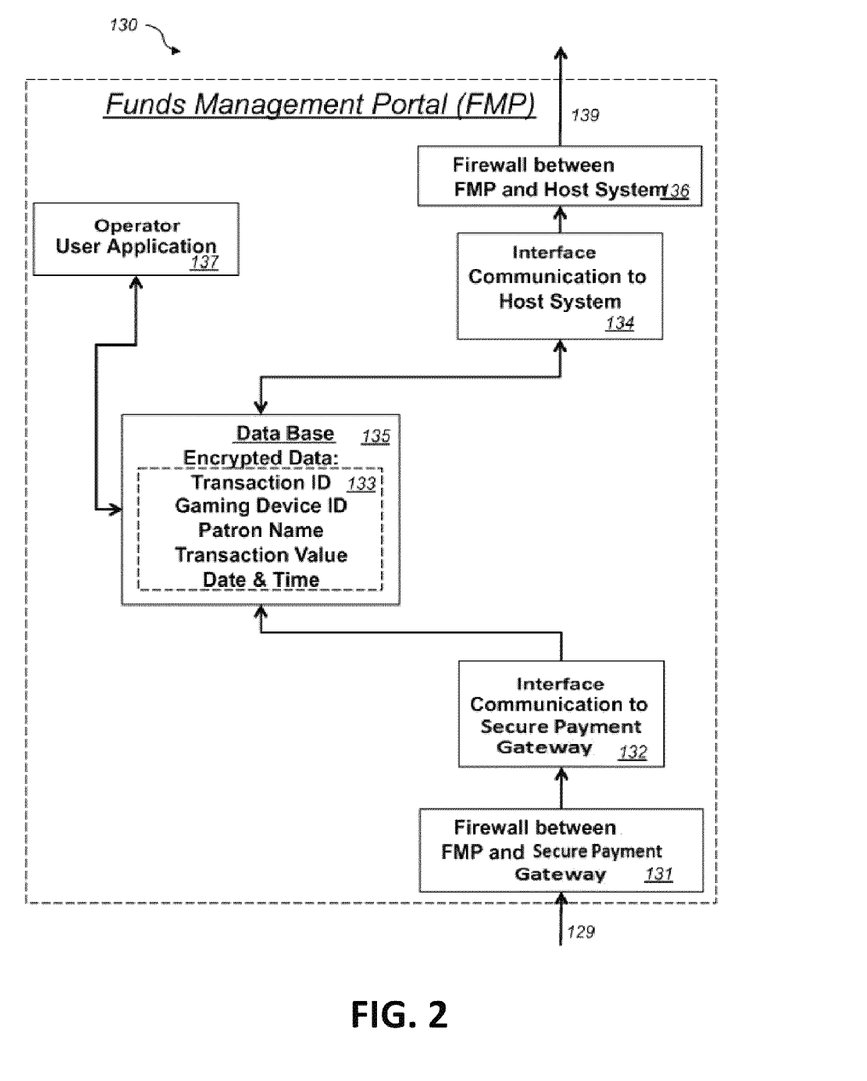
FIG. 2 is a block diagram of the ACS funds management portal of FIG. 1.

Referring to FIG. 2, the funds management portal 130 includes a database 135, firewalls 131 and 136, interfaces 132 and 134, and an operator patron application 137. Firewall 131 is located between the funds management portal 130 and the secure payment gateway 120. Firewall 136 is located between the funds management portal 130 and the gaming host system 140. Interface 132 is for communications between the funds management portal 130 and the secure payment gateway 120. Interface 134 is for communications between the funds management portal 130 and the gaming host system 140. Database 135 includes encrypted data for each transaction 133. The transaction data include a transaction ID, a gaming credit system ID, a gaming device ID, patron's name, transaction value, date, and time.

Figure 3:
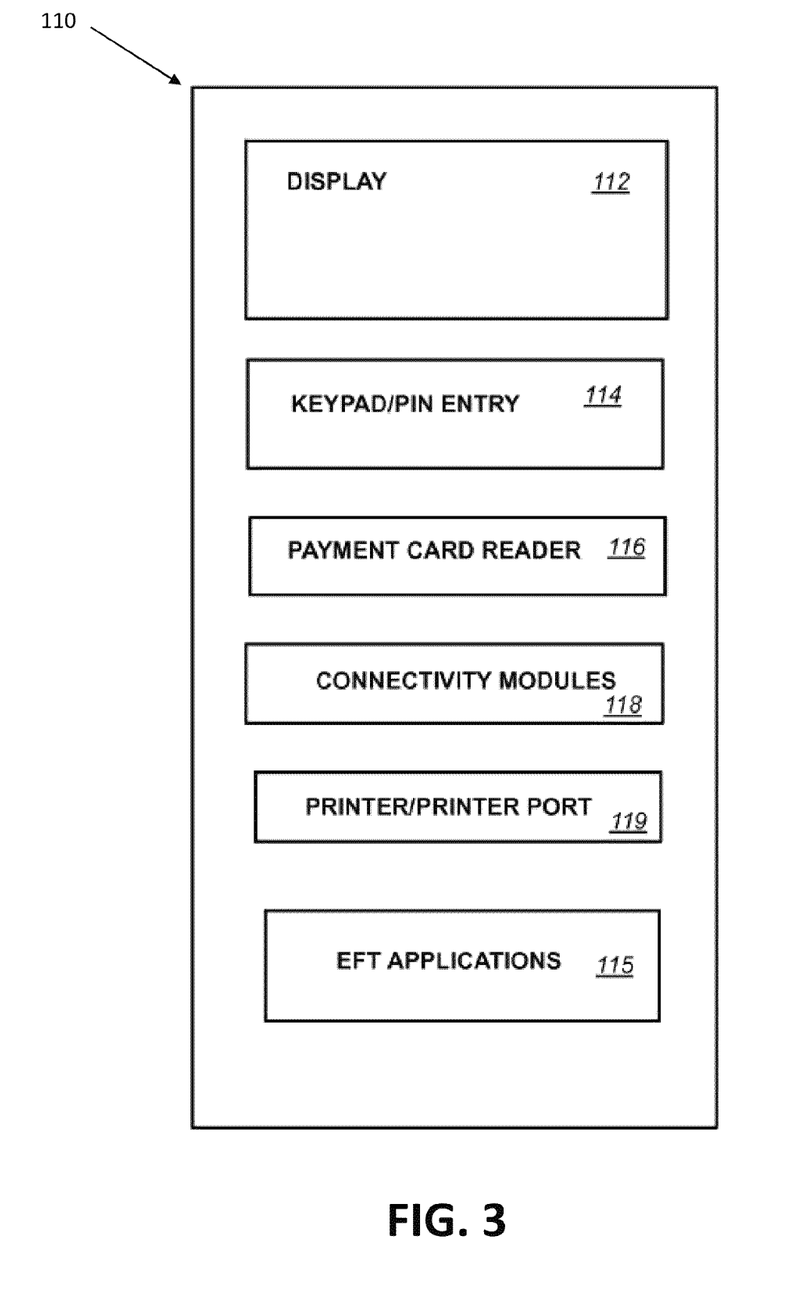
FIG. 3 is a block diagram of the EFT terminal of FIG. 1.

Referring to FIG. 3, an EFT terminal 110 includes a display 112, a keypad/PIN entry 114, a payment card reader 116, connectivity modules 118, a printer and/or printer ports 119, and EFT applications 115. The payment card reader may be a smart card reader, magnetic card reader, contactless card reader, proximity mobile payments reader that enables communication with smart phone devices or contactless proximity card reader that processes secure smart ticketing and electronic payments using contactless secure mobile commerce technology. EFT applications 115 include applications that identify the gaming credit system and gaming device associated with the EFT terminal, ATM network, type of transaction, amount to be transferred, date, time and name of patron.

Referring to back FIG. 1, one or more EFT terminals 110 interact with the secure payment gateway 120 via network connections 111. The secure payment gateway 120 is in contact with the patron's bank accounts 151, 152, 153, via the ATM/Debit networks 150. The ATM networks 150 are connected to the secure payment gateway 120 via a single, secure, access controlled connection 160.

EFT terminals 110 are usually handheld remote communication devices on which the application patron interface is executed. Examples of handheld communication devices include terminals, mobile phones, personal digital assistant (PDA), payment modules, and portable computers, among others. In other embodiments EFT terminals 110 are not handheld devices and may be a personal computer, server or any other computing circuits. EFT components for use with gaming systems may also be an external attachment or embedded in a slot machine or amusement device. EFT terminals may also include remote/mobile/handheld system components or terminals assigned to table games and parlor games. Table game-specific tethered processing terminals may include embedded swipe components fitted to seated game stations in race and sports book, keno and bingo operations, or swipe components embedded into mobile handheld games.

Secure payment gateway 120 is a single, secure pipeline through which the ATM networks 150 and the EFT terminals 110 communicate. EFT terminals 110 are able to contact only secure payment gateway 120 and secure payment gateway 120 controls the communications between the ATM networks 150 (and its potentially sensitive or proprietary data) and those EFT terminals that wish to use it. This enables authentication of the EFT terminal and application as well as encryption and secure transmission of network requests from the EFT terminal 110.

Figure 4:
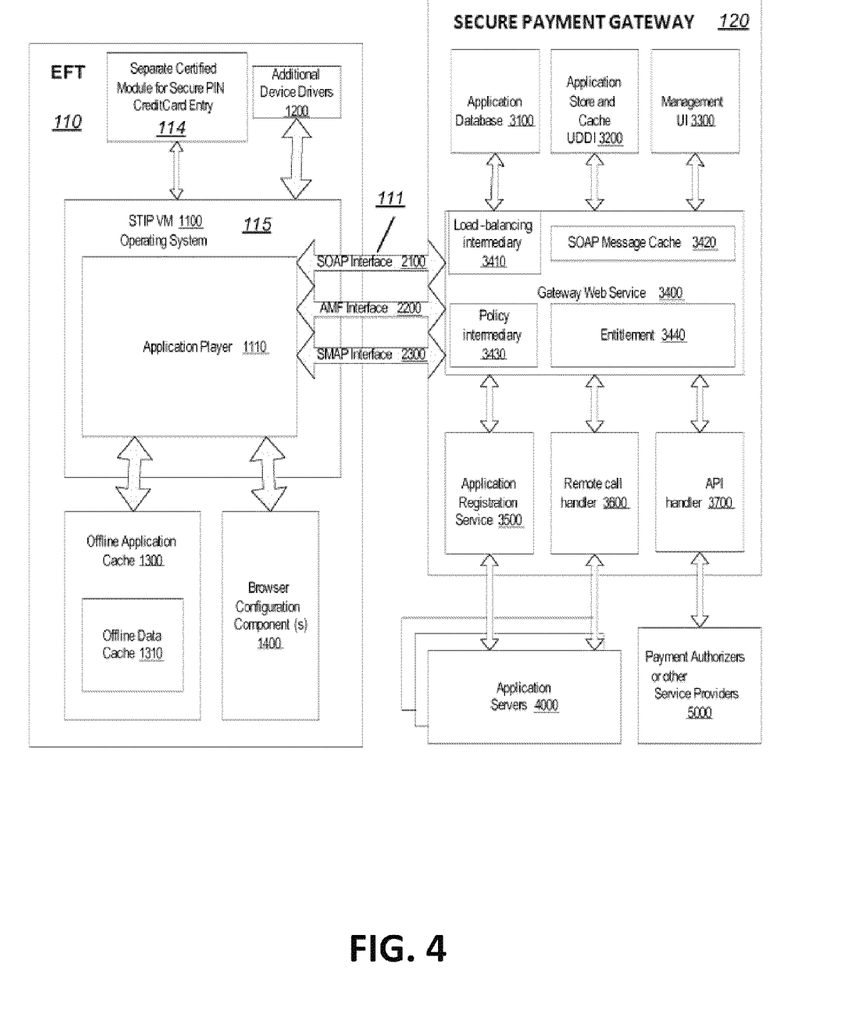
FIG. 4 is a block diagram of the EFT terminal and the secure payment gateway.

Referring to FIG. 3 and FIG. 4, EFT terminal 110 includes an operating system or managed code environment 1100 in which application player 1110 is executed. The managed code environment 1100 is in contact with device drivers 1200. Device drivers 1200 are any hardware access layer modules that allow the player 1110 to access peripheral devices such as card readers 116 or printers 119. Application player 1110 is in contact with browser configuration components 1400 and an offline application cache 1300 with its associated offline application data 1310. The application player 1110 requests functionality from the secure payment gateway 120 through XML messages embedded in Simple Object Access Protocol (SOAP) requests and then interprets the XML messages it receives embedded in SOAP responses from secure payment gateway 120. The application player 1110 has access to a local list of ATM networks it is authorized to request and relevant security keys and settings. The secure payment gateway 120 includes a server-side intermediary 3400 that receives the XML messages embedded in SOAP requests from the player 1110 and sends to the player 1110 XML messages embedded in SOAP responses. As mentioned above, the format of communications between the application player 1110 and the server-side intermediary 3400 is XML and the communication connection is via a SOAP interface 2100.

In one example, the managed code environment 1100 is a Small Technical Interoperability Platform Virtual Machine (STIP VM). Other examples of the managed code environment 1100 include Java 2 Platform Micro Edition (J2ME), .NET and Flash Lite, among others. Operating environment 1100 provides a way for the player 1110 to access operating system resources. The managed code environment 1100 executes the application player 1110, which is in contact with browser configuration components 1400 and an offline application cache 1300 with its associated offline application data 1310. Offline application cache 1300 is a set of applications (XML files) that this player instance has downloaded. Offline data cache 1310 is the set of stored web service calls that each application has saved for later execution on the application server host. These stored web service calls enable the offline functionality. Browser Configuration Components 1400 is a set of device-specific parameters that the player 1110 and its applications use to tailor the patron's experience of applications. These configuration components are locally stored name-value pairs that can be managed both locally and remotely via the server 3000. Examples of browser configuration parameters include, maximum size of the offline cache, auto-player-update on/off, auto-application-update on/off, and debug logging on/off, among others.

Referring again to FIG. 4, secure payment gateway 120 includes a server-side intermediary or gateway web service 3400 through which all communications to and from the EFT terminals 110 pass. The server-side intermediary 3400 has access to a database with a table that associates Global Unique Identifiers (GUIDs) with the remote ATM networks. The Gateway web service 3400 comprises one or more server-side machines that act as intermediaries between the EFT terminals 110 and the application servers 4000 which host the ATM networks that provide bank account access to the EFT terminals 110. These one or more server-side machines include a load-balancing intermediary 3410, a SOAP message cache 3420, a policy intermediary 3430 and an entitlement module 3440. The load-balancing intermediary 3410 is designed to facilitate the demands of numerous EFT terminals 110 simultaneously by dispatching requests evenly among the various server-side machines that comprise the secure payment gateway 120. The SOAP Message Cache 3420 is a queue of SOAP messages to be executed by the server whose results will typically be passed back to an EFT terminal 110. The policy intermediary 3430 ensures that only authorized patrons on authorized EFT terminals can access the requested ATM networks and bank accounts. The entitlement module 3440 controls the access that a request has to the resources it desires. Fine grained web service access control is enabled by this entitlement module.

The Gateway web service 3400 is in communication with an application database 3100, an application store and cache 3200, a management UI 3300, an application registration service 3500, a remote call handler 3600 and an API handler 3700. The application database 3100 includes a set of application XML files representing the currently available applications in the system. The application database 3100 cross-references Globally Unique Identifiers (GUIDS) sent by the client application player 1110 with the XML patron interface of the requested ATM network and bank account. The application store and cache 3200 is an interface into the application database 3100 that conforms to the Universal Description Discovery and Integration (UDDI) discovery standards for machine readable service functionality discovery. Management Patron Interface (UI) 3300 is a set of web application screens that allow data center administrators to control the use of the system, for example, allowing or disallowing access to a particular ATM network, or promoting an application from test to production. The Application Registration Service 3500 is the module that allows the developer to publish an application from the Integrated Development Environment (IDE).

The remote call handler 3600 executes properly authenticated web service calls and the Application Program Interface (API) handler 3700 is an interface that external services 5000 (like payment processors) implement in order to be accessed from within the system.

Secure payment gateway 120 securely handles interaction between the EFT terminals 110 and the application servers 4000 which host the ATM network web services that provide access to the patron's financial accounts, and between the EFT 110 and any supporting applications 5000. All data processing and other calculations and manipulations are executed by ATM network web services hosted on application servers 4000. The patron's experience on the EFT terminal 110 comprises only display of an XML patron interface and subsequent display of application results, also received in the form of XML.

Secure payment gateway 120 provides a single, secure, access-controlled and actively managed channel from the application running on the EFT terminal to the (one or more) ATM network web services. Since the player 1110 communicates only with the secure payment gateway 120, applications running on the EFT terminal 110 cannot connect with unauthorized web applications and are therefore secure. The system is secure along all links via the use of industry standard link encryption and access controlled at all interfaces via the use of industry-standard patron authentication. Link encryption refers to communications security protocols that encrypt and decrypt all traffic at each end of a communications line. Examples of industry standard link encryptions include secure HTTP (S-HTTP), web-services security (WS-S) and Way Systems Secure mobile application platform (WS-SMAP), among others. Patron authentication refers to the process of establishing or confirming the digital identity of a patron or device such as the EFT terminal 110 or the servers 4000 and 5000. Examples of industry standard patron authentication include WS-S, lightweight directory access protocol (LDAP) and proprietary device authentication, among others.

Secure payment gateway 120 provides fine-grained access control over web service (WS) access organized by remote-patron and remote-device that spans multiple WS hosts and organizations and requires no instrumentation of the individual web services. As was mentioned above, secure payment gateway 120 maintains access-control lists that relate patrons and EFT terminals to individual ATM network web services and provide for granting and denying access by those patrons to those services. These lists contain the unique combination of GUIDS and the identity of remote ATM network web services available to the EFT terminals 110.

A key feature of application security best-practice is the concept of non-repudiation. Non-repudiation is defined as the ability of a component to prove that a particular action of that component was driven by an interaction with another component rather than by some invisible, internal process of that component. The key enabler of non-repudiation is auditing, the storage of a trail of actions and data that can easily be used to reconstruct the interactions of the components of the system. The secure payment gateway 120 provides a complete audit trail of the interaction of ATM network web services with the remote EFT terminals 110, thus ensuring non-repudiation. This audit trail identifies the EFT terminal, the patron, and the details of the underlying remote connection to the terminal. In one implementation, fine-grained access control and auditing enable the secure payment gateway 120 to bill patrons at an equally fine-grained level. This enables tiered service by enterprises implementing the system where patrons can be billed for individual calls within a session rather than at the more coarse system of billing for time spent within the application.

Figure 5:
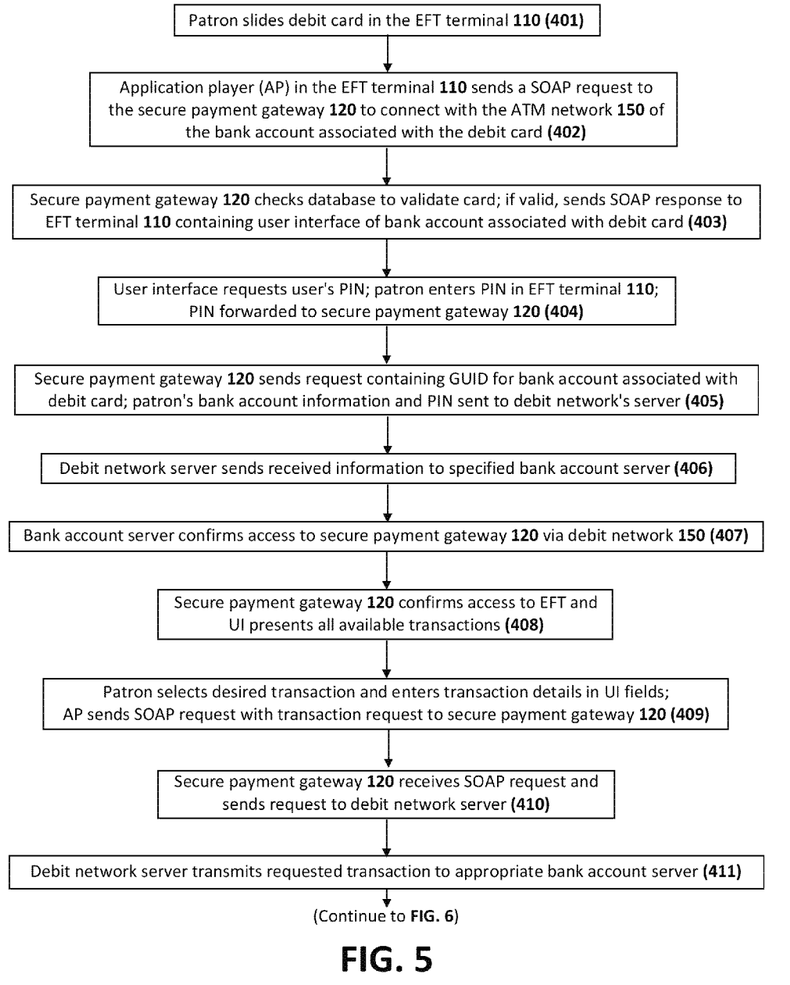
FIG. 5 and FIG. 6 depict the flow diagram of the EFT process.
Figure 6:
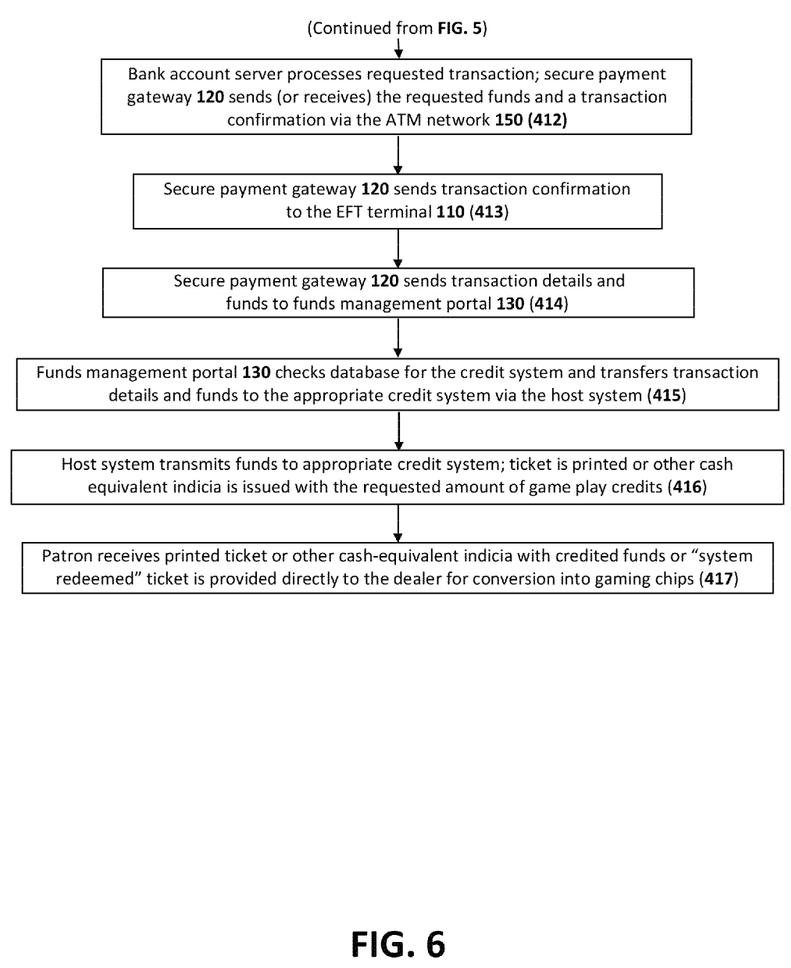

In operation, a patron starts the application player 1110 on the EFT terminal 110. The application player 1110 consults first the offline application cache 1300 and presents a list of those applications which this EFT terminal 110 and patron are authorized to execute. Referring to FIG. 5 and FIG. 6, if the EFT terminal 110 and the secure payment gateway 120 are both actively connected to the network, the process includes the following steps. First, a patron slides a debit card in the EFT terminal (401). This action starts an application player (AP) in the EFT device and the AP sends a SOAP request to the secure payment gateway intermediary server (IS) to connect with the ATM network of the bank account associated with the debit card (402). The IS checks a database and if this is an acceptable debit card it sends a SOAP response to the EFT terminal containing the patron interface (UI) of the bank account associated with the debit card (403). The UI requests a patron name and a PIN, the patron enters his patron name and PIN and the information is sent to the IS (404). Next, the IS sends to the debit network server a request containing a GUID for the bank account associated with the debit card, the patron's bank account information, and the patron's PIN (405). The debit network server forwards the received information to the specified bank server (406) and the bank server confirms access to the secure payment gateway IS via the debit network (407). The secure payment gateway IS confirms access to EFT and the UI presents all available transactions (408). Examples of the available transactions include fund transfer, withdrawal, deposit and balance inquiry, among others. The patron selects a desired transaction and enters the transaction details in the corresponding UI fields. The AP then sends a SOAP request to IS with the requested transaction (409). Typical transaction details include, amount, currency, gaming device, among others. The IS receives the SOAP request, determines appropriate debit network server for the requested transaction and sends the request to the debit network server (410). The debit network server transmits the request to the appropriate bank server (411) and the bank server processes the requested transaction, sends (or receives) the requested funds and a transaction confirmation to the IS via the ATM network (412). Next, the IS sends the transaction confirmation to the EFT terminal (413) and the transaction details and funds to the funds management portal (414). The funds management portal checks its database for the appropriate gaming device/ticket printer and transfers the transaction details and funds to the appropriate gaming device/ticket printer via the host system (415). The host system then transmits the funds to a gaming credit system and a ticket printer associated with the appropriate EFT terminal and the printer prints a ticket with the requested amount (416). The patron receives the printed ticket with the credited funds and uses it in the gaming device or cashes it out (417).

A typical network connection between secure payment gateway intermediary server (IS) 120 and the external web services is HTTPS/TCP/IP over the public Internet. Other examples of physical networks supported include, GSM, iDEN, D-AMPS, cdmaOne, PDC, CSD, PHS, GPRS, HSCSD, WiDEN, CDMA2000 1xRTT, EDGE, W-CDMA, UMTS, FOMA, CDMA2000 1xEV, TD-SCDMA, UMA, HSUPA, HSUPA, SONET, Ethernet, Ethernet V2, X.21, and ISDN, among others.

Other implementations of the invention may replace the SOAP 2100 with Action Script Message Format (AMF) 2200 or SMAP 2300. SOAP interface 2100 is one of the potential mechanisms by which the player and server communicate. Only one of 2100, 2200 or 2300 is used in any player deployment. SOAP is an object oriented Remote Procedure Call (RPC) formatted in XML. AMF 2200 is another communication protocol, currently favored by Macromedia Flash. SMAP 2300 is a communication protocol proprietary to Way Systems that includes transport layer and application layer functionality (i.e., authentication).

Several embodiments of the present invention have been described. While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings without departing from the essential scope thereof. Therefore, it is intended that the disclosure not be limited to the particular embodiments disclosed as the best mode contemplated for carrying out this disclosure.

I claim:

1. A system for purchasing gaming or amusement credits via electronic funds transfer, the system comprising:
   (A) at least one gaming device;
   (B) at least one credit system configured to dispense gaming or amusement credits suitable for use with the at least one gaming device to a patron;
   (C) a secured first computing device in electronic communication with the at least one credit system;
   (D) an electronic funds transfer terminal certified for use in an electronic funds transfer system (i) proximate to but separate from the at least one credit system, (ii) in exclusive secured electronic communication with the secured first computing device, (iii) configured to receive instructions from the patron to transfer funds from a financial account to purchase gaming or amusement credits, and (iv) further configured to communicate an electronic fund transfer request to the secured first computing device;
   (E) the secured first computing device (i) in further secured electronic communication with a network associated with the financial account, (ii) further configured to communicate the electronic fund transfer request to the network associated with the financial account, (iii) further configured to receive a transfer of electronic funds via the network associated with the financial account, and (iv) further configured to transmit an authorization to the at least one credit system to dispense gaming or amusement credits to the patron; and
   (F) a secured second computing device comprising a database separate from, but in secured electronic communication with, the secured first computing device and configured to receive confirmation of the transfer of electronic funds from the secured first computing device.

2. The system of claim 1 wherein all communications between the electronic funds transfer terminal and the network associated with the financial account pass through the secured first computing device and are not accessible to the secured second computing device or the credit system.

3. The system of claim 1 wherein all communications between the secured first computing device and the credit system are not accessible to the electronic funds transfer terminal.

4. The system of claim 2 wherein all communications between the secured first computing device and the credit system are not accessible to the electronic funds transfer terminal.

5. The system of claim 1 wherein the secured second computing device is further configured to provide accounting and reconciliation for all transfers of electronic funds and for all authorizations to dispense gaming or amusement credits to patrons.

6. The system of claim 1 wherein the secured first computing device is further configured to provide accounting and reconciliation of all interactions between the network associated with the financial account and the electronic funds transfer terminal.

7. The system of claim 1 wherein the electronic funds transfer terminal is not configured to dispense credits to a patron.

8. The system of claim 1 wherein the electronic funds transfer terminal further comprises at least one of a Payment Card Industry (PCI) certified device, a PIN entry device (PED) certified device, a point-of-sale (POS) personal identification number (PIN) entry keypad, a payment card reader, a display, a network connectivity module, a printer, a printer port, a secure mobile application, a secure client-side application, and a secure electronic funds transfer application.

9. The system of claim 8, wherein the payment card reader comprises a smart card reader, a magnetic card reader, a contactless card reader, or a secure contactless proximity card reader.

10. The system of claim 1 wherein the secured first computing device is further configured to communicate a confirmation or denial of the electronic fund transfer request to the electronic funds transfer terminal and the electronic funds transfer terminal is further configured to (a) receive from the secured first computing device the communication of confirmation or denial of the electronic fund transfer request and (b) display to the patron the confirmation or denial of the electronic fund transfer request.

11. The system of claim 1 wherein the secured first computing device is further configured to communicate a confirmation or denial of the electronic fund transfer request to the electronic funds transfer terminal and the electronic funds transfer terminal is further configured to (a) receive from the secured first computing device the confirmation or denial of the electronic fund transfer request and (b) provide confirmation or denial of the electronic fund transfer request to the patron in the form of a printed receipt.

12. The system of claim 1 wherein the at least one credit system is not exclusively reserved for use by the secured first computing device.

13. The system of claim 1 wherein the at least one credit system is exclusively reserved for use by the secured first computing device.

14. The system of claim 1 wherein the at least one credit system is configured to dispense gaming or amusement credit to the patron as an electronic credit on a local or remote gaming or amusement machine.

15. The system of claim 1 wherein the at least one credit system is configured to dispense gaming or amusement credit to the patron in the form of a redeemable ticket or voucher.

16. The system of claim 1 wherein the at least one credit system is configured to dispense gaming or amusement credit to the patron in the form of casino chips or tokens.

17. The system of claim 1 wherein the at least one credit system is configured to dispense gaming or amusement credit to the patron as an electronic credit to patron's account in a player's card system.

18. The system of claim 1 wherein the network associated with the financial account comprises one of the PLUS, STAR, CIRRUS, INTERLINK, MONEY PASS or NYCE networks.

19. A system for purchasing gaming or amusement credits via electronic funds transfer, the system comprising:
(A) a financial account associated with a patron;
(B) a secured network associated with the financial account;
(C) at least one gaming device;
(D) a secured first computing device communicatively connected to the secured network associated with the financial account;
(E) an electronic funds transfer terminal certified for use in an electronic funds transfer system and in exclusive secured communication with the secured first computing device;
(F) a secured second computing device comprising a database in secured communication with the secured first computing device;
(G) at least one credit system communicatively connected to the secured first computing device; wherein the system is configured to (i) accept instructions from the patron to purchase gaming or amusement credits via an electronic funds transfer at the electronic funds transfer terminal, (ii) communicate an electronic funds transfer request from the electronic funds transfer terminal via the secured first computing device to the secured network associated with the financial account, (iii) receive from the secured network associated with the financial account by the secured first computing device a transfer of electronic funds, (iv) communicate an authorization from the secured first computing device to the at least one credit system to dispense gaming or amusement credits to the patron, and (v) dispense gaming or amusement credits suitable for use with the at least one gaming device to the patron via the at least one credit system.

20. A system for purchasing gaming or amusement credits at a gaming or amusement device via electronic funds transfer, the system comprising:
(A) a secured first computing device with exclusive system access to a secured network associated with a financial account of a patron;
(B) an electronic funds transfer terminal certified for use in an electronic funds transfer system separate from, but in exclusive secured exclusive communication with, the secured first computing device and configured to originate an electronic funds transfer request from the patron; and
(C) at least one credit system separate from, but communicatively connected to, the secured first computing device and configured to dispense gaming or amusement credits suitable for use with the at least one gaming device to the patron upon receipt of authorization originating from the secured first computing device;
wherein the system is configured to (i) route the electronic funds transfer request from the electronic funds transfer terminal to the secured network associated with the financial account of a patron via the secured first computing device, (ii) receive authorization for an electronic funds transfer at the secured first computing device, (iii) communicate, from the secured first computing device to the at least one credit system, an authorization to dispense gaming or amusement credits, and (iv) dispense, by the at least one credit system, gaming or amusement credits suitable for use with the at least one gaming device to the patron.

* * * * *